US010618314B2

(12) United States Patent
Shinagawa

(10) Patent No.: US 10,618,314 B2
(45) Date of Patent: Apr. 14, 2020

(54) NON-TRANSITORY STORAGE MEDIUM STORING INSTRUCTIONS READABLE BY INFORMATION PROCESSING APPARATUS, AND CODE CREATING SYSTEM

(71) Applicant: BROTHER KOGYO KABUSHIKI KAISHA, Aichi-ken (JP)

(72) Inventor: Mina Shinagawa, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/258,245

(22) Filed: Jan. 25, 2019

(65) Prior Publication Data

US 2019/0232680 A1 Aug. 1, 2019

(30) Foreign Application Priority Data

Jan. 29, 2018 (JP) .................................. 2018-013040

(51) Int. Cl.
*B41J 3/01* (2006.01)
*B41J 3/407* (2006.01)
*B41J 2/325* (2006.01)
*G06F 3/12* (2006.01)
*B41J 35/18* (2006.01)

(52) U.S. Cl.
CPC ................. *B41J 3/01* (2013.01); *B41J 2/325* (2013.01); *B41J 3/4075* (2013.01); *B41J 35/18* (2013.01); *G06F 3/1205* (2013.01); *G06F 3/1208* (2013.01); *G06F 3/1254* (2013.01); *G06F 3/1255* (2013.01); *G06F 3/1285* (2013.01)

(58) Field of Classification Search
CPC ... B41J 3/01; B41J 3/4075; B41J 2/325; B41J 35/18; G06F 3/1285; G06F 3/1255; G06F 3/1254; G06F 3/1205; G06F 3/1208
USPC .......................................................... 347/176
See application file for complete search history.

(56) References Cited

U.S. PATENT DOCUMENTS

| 6,283,647 | B1 | 9/2001 | Konishi et al. | |
|---|---|---|---|---|
| 9,052,849 | B1* | 6/2015 | McDonnell | G06F 3/1204 |
| 2007/0033164 | A1* | 2/2007 | Dubos | G06F 3/1204 |

(Continued)

FOREIGN PATENT DOCUMENTS

| JP | 2000-285192 A | 10/2000 |
|---|---|---|
| JP | 2007-304652 A | 11/2007 |

*Primary Examiner* — Huan H Tran
*Assistant Examiner* — Alexander D Shenderov
(74) *Attorney, Agent, or Firm* — Kenealy Vaidya LLP

(57) ABSTRACT

A non-transitory storage medium stores instructions readable by an information processing apparatus. The instructions cause the information processing apparatus to: obtain a type of a printer; obtain a combination between a type of a printing medium and a color of a coloring agent for printing of a code; determine whether the obtained combination is included in a first combination or whether the obtained combination is included in a second combination; and output an alert message when the obtained combination is included in the second combination or not included in the first combination. A combination between the color and the type of the printing medium printable by the printer of the obtained type includes the first combination in which a probability of reading of the code is a first value and the second combination in which the probability is a second value less than the first value.

18 Claims, 7 Drawing Sheets

(56) References Cited

U.S. PATENT DOCUMENTS

| | | | |
|---|---|---|---|
| 2008/0225328 A1* | 9/2008 | Milton | H04N 1/00222 358/1.15 |
| 2010/0073695 A1* | 3/2010 | Duggan | G06K 15/02 358/1.6 |
| 2012/0092693 A1* | 4/2012 | Jaudon | G06F 3/1204 358/1.13 |
| 2015/0042741 A1* | 2/2015 | Tomomatsu | B41J 2/325 347/172 |
| 2015/0070725 A1* | 3/2015 | Monden | G06F 3/1232 358/1.15 |
| 2015/0254248 A1* | 9/2015 | Burns | G06F 16/24578 707/749 |
| 2018/0253271 A1* | 9/2018 | Oida | B41J 2/32 |

* cited by examiner

| TAPE WIDTH | TAPE ID | COLOR NAME |
|---|---|---|
| 3.5mm | 1 | WHITE/BLACK |
| 6mm | 2 | WHITE/BLACK |
| | 3 | YELLOW/BLACK |
| 9mm | 2 | WHITE/BLACK |
| | 3 | WHITE/RED |
| | 4 | WHITE/BLUE |
| | 5 | YELLOW/BLACK |
| | 10 | WHITE (LAMINATED)/BLACK |
| | 11 | YELLOW (LAMINATED)/BLACK |
| 12mm | 5 | WHITE/BLACK |
| | 6 | WHITE/RED |
| | 7 | WHITE/BLUE |
| | 12 | YELLOW/BLACK |
| | 14 | FLUORESCENT ORANGE/BLACK |
| | 15 | FLUORESCENT YELLOW/BLACK |
| | 17 | SILVER (FROSTED)/BLACK |
| | 29 | WHITE (LAMINATED)/BLACK |
| | 30 | YELLOW (LAMINATED)/BLACK |
| 18mm | 2 | WHITE/BLACK |
| | 5 | YELLOW/BLACK |
| | 7 | FLUORESCENT ORANGE/BLACK |
| | 8 | WHITE/RED |
| | 9 | WHITE/BLUE |
| | 13 | SILVER (FROSTED)/BLACK |
| | 15 | WHITE (LAMINATED)/BLACK |
| | 16 | YELLOW (LAMINATED)/BLACK |
| 24mm | 2 | WHITE/BLACK |
| | 5 | YELLOW/BLACK |
| | 7 | FLUORESCENT ORANGE/BLACK |
| | 8 | FLUORESCENT YELLOW/BLACK |
| | 9 | WHITE/RED |
| | 10 | WHITE/BLUE |
| | 13 | SILVER (FROSTED)/BLACK |
| | 18 | WHITE (LAMINATED)/BLACK |
| | 19 | YELLOW (LAMINATED)/BLACK |

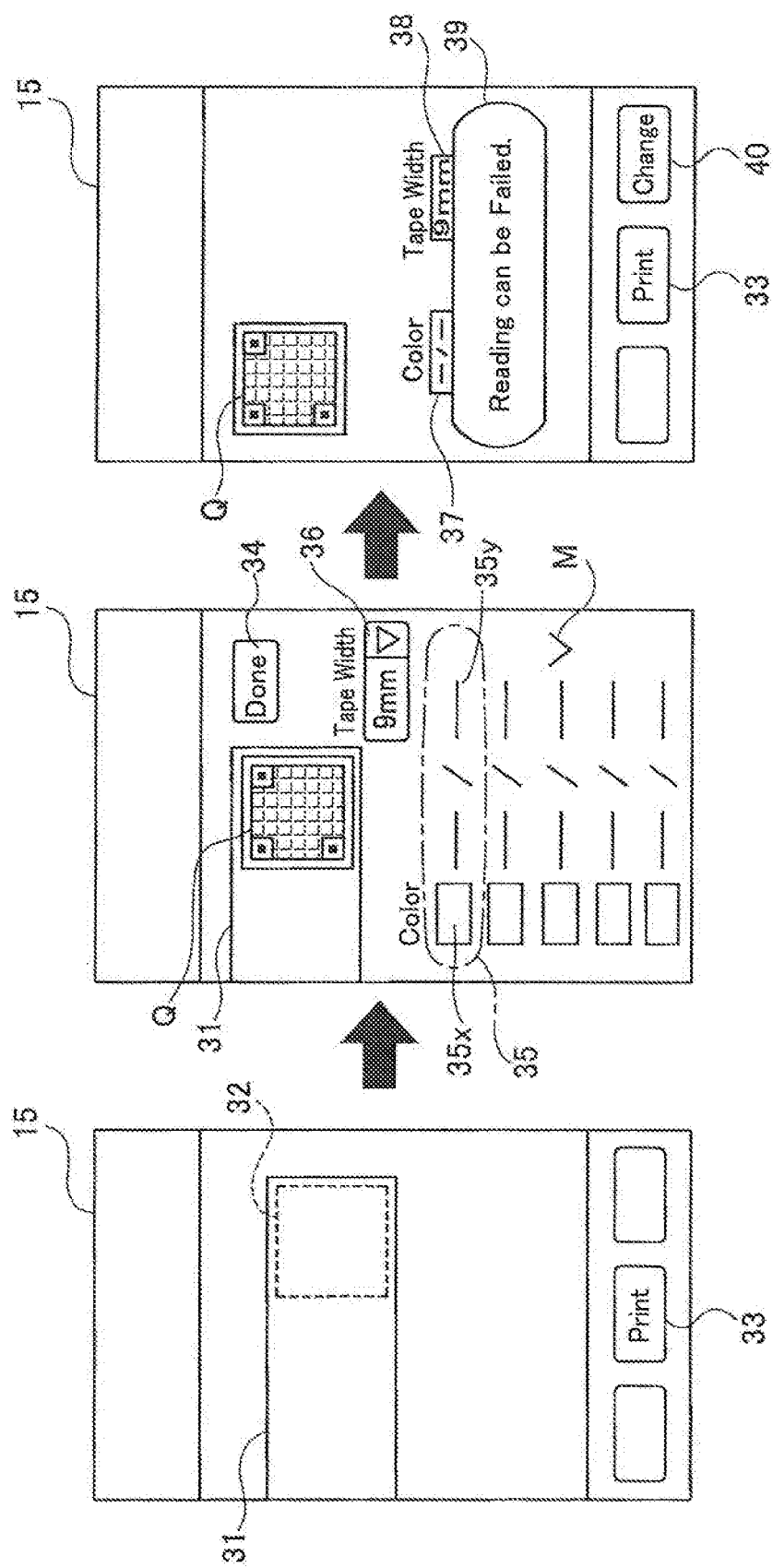

NON-TRANSITORY STORAGE MEDIUM STORING INSTRUCTIONS READABLE BY INFORMATION PROCESSING APPARATUS, AND CODE CREATING SYSTEM

CROSS REFERENCE TO RELATED APPLICATION

The present application claims priority from Japanese Patent Application No. 2018-013040, which was filed on Jan. 29, 2018, the disclosure of which is herein incorporated by reference in its entirety.

BACKGROUND

The following disclosure relates to a non-transitory storage medium storing a plurality of instructions readable by a computer of an information processing apparatus to create a code storing various kinds of information, and to a code creating system.

There is conventionally known a technique of storing various kinds of information, such as a uniform resource locator (URL), into a code, and printing an image including the code on a printing medium such as a label. For example, there is known a configuration in which a short URL associated with a URL of a website and shorter than the URL of the website is created based on the URL of the website to create a QR code (registered trademark) storing the short URL.

SUMMARY

It is difficult to read the printed code in some combinations between the type of the printing medium and the color of a coloring agent. For example, reading of the code easily fails in a case of a combination of approximate colors such as a combination of blue and black.

Accordingly, an aspect of the disclosure relates to a non-transitory storage medium storing a plurality of instructions readable by a computer of an information processing apparatus, and a code creating system, capable of reducing printing of a code having difficulty in reading.

One aspect of the disclosure relates to a non-transitory storage medium storing a plurality of instructions readable by a computer of an information processing apparatus. The information processing apparatus includes a communication interface. When executed by the computer, the plurality of instructions cause the information processing apparatus to execute: a printer-type obtaining processing in which the information processing apparatus obtains a type of a printer; a combination obtaining processing in which the information processing apparatus obtains a combination between a type of a printing medium and a color of a coloring agent for printing of a code by the printer; a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable by the printer of the type obtained in the printer-type obtaining processing includes (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

Another aspect of the disclosure relates to a non-transitory storage medium storing a plurality of instructions readable by a computer of an information processing apparatus. The information processing apparatus includes a communication interface configured to be connected to a printer. When executed by the computer, the plurality of instructions cause the information processing apparatus to execute: a printer-type obtaining processing in which the information processing apparatus obtains a type of the printer; and a selection processing in which the information processing apparatus selects and determines a combination from among a plurality of combinations between a type of a printing medium and a color of a coloring agent for printing of a code by the printer. When executed by the computer, the plurality of instructions cause the information processing apparatus to execute the selection processing in which in a case where a combination between the color of the coloring agent and the type of the printing medium printable by the printer of the type obtained in the printer-type obtaining processing includes (i) a first combination in which a probability of reading of the code is a first value and (ii) a second combination in which the probability of reading of the code is a second value that is less than the first value, the information processing apparatus excludes the second combination from the plurality of combinations.

Yet another aspect of the disclosure relates to a non-transitory storage medium storing a plurality of instructions readable by a computer of an information processing apparatus. The information processing apparatus includes a communication interface configured to be connected to a printer. When executed by the computer, the plurality of instructions cause the information processing apparatus to execute: a printer-type obtaining processing in which the information processing apparatus obtains a type of the printer; a medium-type obtaining processing in which the information processing apparatus obtains a length of a printing medium mounted in the printer in at least one direction; a combination obtaining processing in which the information processing apparatus obtains a combination between a type of a printing medium and a color of a coloring agent for printing of a code by the printer; a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable, in the length of the printing medium mounted in the printer in the at least one direction, by the printer of the type obtained in the printer-type obtaining processing includes (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

In yet another aspect of the disclosure, a code creating system includes: an information processing apparatus including a controller; and a printer. The controller is configured to control the information processing apparatus to execute: a printer-type obtaining processing in which the information processing apparatus obtains a type of a printer; a combination obtaining processing in which the information processing apparatus obtains a combination between a type of a printing medium and a color of a coloring agent for printing of a code by the printer; a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable by the printer of the type obtained in the printer-type obtaining processing includes (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

In yet another aspect of the disclosure, a code creating system includes: an information processing apparatus including a controller; and a printer. The controller is configured to control the information processing apparatus to execute: a printer-type obtaining processing in which the information processing apparatus obtains a type of the printer; and a selection processing in which the information processing apparatus selects and determines a combination from among a plurality of combinations between a type of a printing medium and a color of a coloring agent for printing of a code by the printer. When executed by the computer, the plurality of instructions cause the information processing apparatus to execute the selection processing in which in a case where a combination between the color of the coloring agent and the type of the printing medium printable by the printer of the type obtained in the printer-type obtaining processing includes (i) a first combination in which a probability of reading of the code is a first value and (ii) a second combination in which the probability of reading of the code is a second value that is less than the first value, the information processing apparatus excludes the second combination from the plurality of combinations.

In yet another aspect of the disclosure, a code creating system includes: an information processing apparatus including a controller; and a printer. The controller is configured to control the information processing apparatus to execute: a medium-type obtaining processing in which the information processing apparatus obtains a length of a printing medium mounted in the printer in at least one direction; a printer-type obtaining processing in which the information processing apparatus obtains a type of the printer; a combination obtaining processing in which the information processing apparatus obtains a combination between a type of a printing medium and a color of a coloring agent for printing of a code by the printer; a determination processing in which the information processing apparatus determines whether an obtained combination that is the combination obtained in the combination obtaining processing is included in a first combination or whether the obtained combination is included in a second combination, wherein the combination between the color of the coloring agent and the type of the printing medium printable, in the length of the printing medium mounted in the printer in the at least one direction, by the printer of the type obtained in the printer-type obtaining processing includes (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 2 is a view of one example of a combination table;

FIGS. 3A through 3C are views for explaining one example of an edit screen;

DETAILED DESCRIPTION OF THE EMBODIMENTS

Hereinafter, there will be described a code creating program (instructions) and a code creating system according to one embodiment by reference to the drawings. The present disclosure is applied to the code creating system including an information processing apparatus and a printer communicable with each other.

Figure 1:
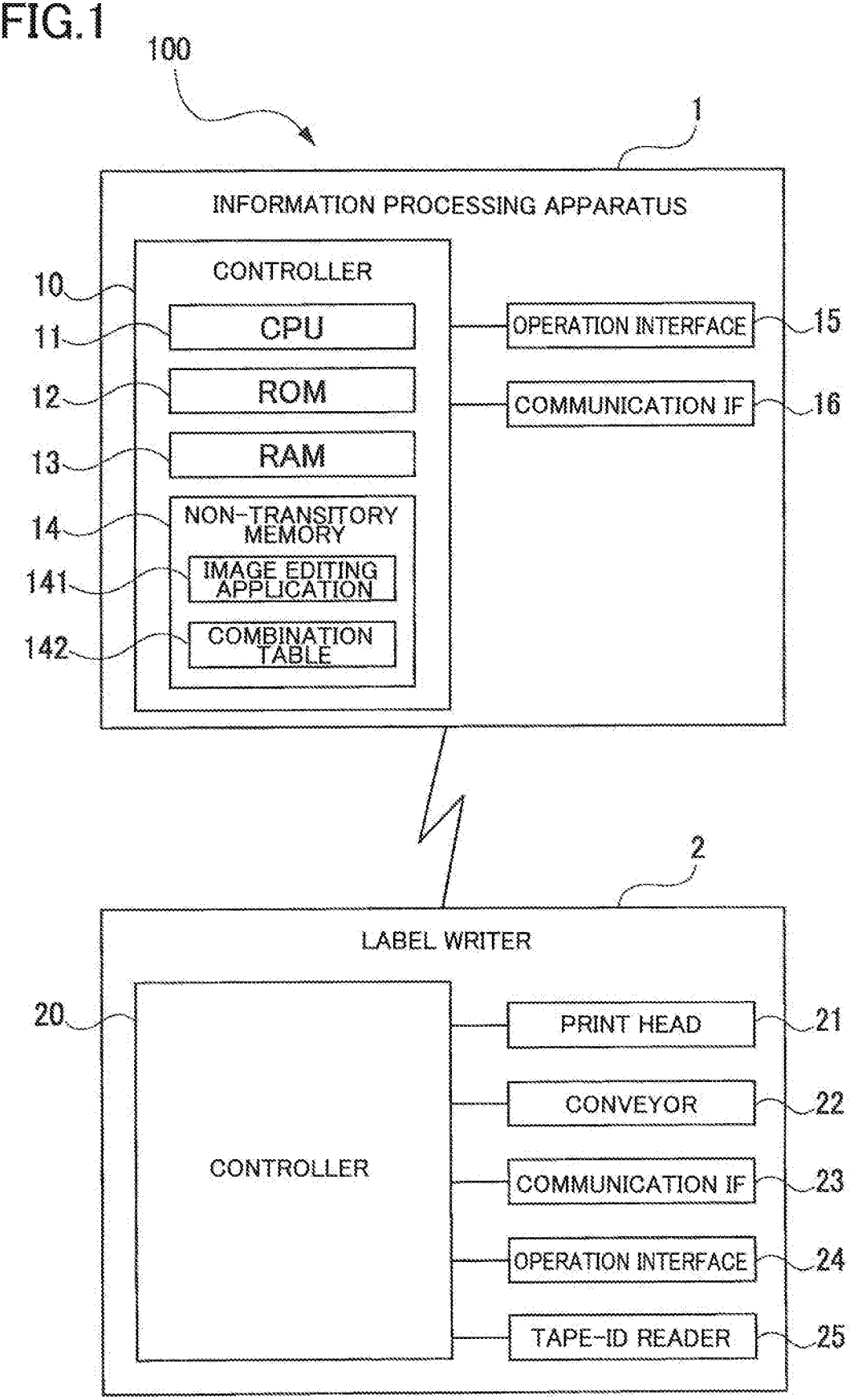
FIG. 1 a schematic view of a code creating system according to one embodiment.

As illustrated in FIG. 1, a code creating system 100 according to the present embodiment includes an information processing apparatus 1 and a label writer 2 communicably connected to each other. The information processing apparatus 1 is configured to create and edit image data to be printed by the label writer 2, instruct the label writer 2 to perform printing, and transmit image data to the label writer 2, for example. Examples of the information processing apparatus 1 include a smartphone, a personal computer, and a tablet computer.

As illustrated in FIG. 1, the information processing apparatus 1 includes a controller 10 that includes a CPU 11, a ROM 12, a RAM 13, and a non-transitory memory 14. The information processing apparatus 1 includes an operation interface 15 and a communication interface 16 that are electrically connected to the controller 10.

The ROM 12 stores various kinds of information such as a start-up program for starting the information processing apparatus 1. The RAM 13 is used as a working area during execution of various kinds of processings and as a storage area for temporarily storing data. The non-transitory memory 14 stores various kinds of programs and data. Examples of the non-transitory memory 14 include an HDD and a flash memory. The CPU 11 executes processings according to the programs read from the ROM 12 and the non-transitory memory 14.

In the present embodiment, the non-transitory memory 14 of the information processing apparatus 1 stores an application program 141 for editing an image and causing the label writer 2 to perform printing based on the edited image. The application program 141 will be hereinafter referred to as "image editing application 141". The image editing application 141 is one example of the code creating program. A plurality of printers may be set for the image editing application 141. In the case where one of the printers is selected, the CPU 11 executes processings according to the image editing application 141 based on an instruction of a user. The non-transitory memory 14 further stores a combination table 142 illustrated in FIG. 2. The combination table 142 will be described later. In the following description, the CPU 11 that executes programs such as the image editing application 141 may be simply referred to as the name of the program. For example, the wording "the image editing application 141 executes" may mean "the CPU 11 that executes the image editing application 141 executes".

The operation interface 15, for example, is a touch screen and configured to accept inputs from the user and display various kinds of information. The information processing apparatus 1 may include other input devices, such as a keyboard, a mouse, and a display, instead of the operation interface 15. The communication interface 16 includes hardware for communicating with the label writer 2. The communication standard may be any standard such as a USB and a LAN. Also, any of wireless communication and wired communication may be used.

In the present embodiment, the label writer 2 is configured to create a label by performing thermal-transfer printing in which an ink ribbon is heated and melted to transfer it to a printing tape as a printing medium. The label writer 2 is one example of a printer. The printing tape is one example of a printing medium. The ink ribbon is one example of a coloring agent.

As illustrated in FIG. 1, the label writer 2 includes a controller 20, a print head 21, a conveyor 22, a communication interface 23, and an operation interface 24. The label writer 2 includes a tape-ID reader 25. The controller 20 includes a CPU and a memory to control the devices of the label writer 2. It is noted that each of the controller 10 and the controller 20 in FIG. 1 is constituted by a plurality of devices used for controls of the information processing apparatus 1 and the label writer 2 and may not be a single hardware device.

The print head 21 performs printing on the printing tape. The conveyor 22 conveys the printing tape. The communication interface 23 includes hardware for communicating with the information processing apparatus 1. The operation interface 24, for example, is a touch screen and configured to accept inputs from the user and display various kinds of information. It is noted that the label writer 2 may include a camera and a configuration for cutting the printing tape. The operation interface 24 may be removed.

A tape cartridge is mountable on and removable from the label writer 2. The tape cartridge accommodates a roll of the continuous printing tape having a strip shape and a roll of the continuous ink ribbon having a strip shape. Thus, the printing tape and the ink ribbon accommodated in the tape cartridge cannot be individually replaced. Accordingly, the type of the printing tape and the color of the ink ribbon (an ink color) are unique to the tape cartridge. The type of the printing tape includes at least one of the color of the printing tape (a tape color), a tape width, and a material such as paper, cloth, the presence or absence of a seal, the presence or absence a shine, and the presence or absence of laminating. Each tape cartridge is assigned with a tape ID, enabling identification of the type of the printing tape and the color of the ink ribbon from the tape ID. The tape ID may be directly printed on the tape cartridge. Alternatively, a seal on which the tape ID is printed may be stuck to the tape cartridge. Protrusions and recesses may be formed on and in a surface of the tape cartridge so as to enable a sensor, such as a mechanical sensor and an optical sensor, to obtain the type of the printing tape and the type of the ink ribbon (the ink color). The type of the printing tape and the color of the ink ribbon may be obtained separately instead of being obtained together via the tape ID.

The tape-ID reader 25 reads the tape ID assigned to the tape cartridge. The tape ID read by the tape-ID reader 25 is transmitted to the information processing apparatus 1 via the communication interface 23. The tape ID is transmitted when the image editing application 141 is started up, when the tape cartridge is mounted on the label writer 2, or when the label writer 2 has received a request of transmission of the tape ID from the information processing apparatus 1, for example. The tape-ID reader 25 may be a sensor such as a mechanical sensor and an optical sensor.

In the present embodiment, the image editing application 141 edits an image to be printed by the label writer 2, based on instructions of the user. The image editing application 141 accepts an instruction for adding characters, a figure, and/or a code to an image being edited, for example. The code may be a one-dimensional code or a two-dimensional code.

The one-dimensional code represents information by means of lines arranged in the lateral direction in a striped pattern. The one-dimensional code includes a bar code, for example. The bar code stores information by means of the widths and spacings of parallel lines.

The two-dimensional code represents information by means of a plurality of cells arranged in a rectangular region. Examples of the two-dimensional code include a QR code, a Data Matrix, and PDF417. The two-dimensional code contains a plurality of cells arranged in a rectangular region and each representing ON or OFF. The two-dimensional code stores information by means of arrangement of the cells.

The combination of the background color of the code and the color of the bars or the cells (a bar color) affects reading of a code reader. The code reader emits red laser light from, e.g., an LED, onto the code and detects light-reflecting portions and light-absorbing portions of the code to obtain an analog waveform and thereby read information stored in the code. Thus, a successful reading rate increases by setting a color easily reflecting the red light (e.g., white, yellow, and orange) as a background color of the code and setting a color easily absorbing the red light (e.g., black, dark blue, dark green, and red) as a color of the bars or the cells (the bar color). The code having the background color and the bar color approximate to each other is unsuited to reading of the code because it is difficult for the code reader to receive the analog waveform. Also, the successful reading rate is low in the case of a code having a color of high light reflectivity, such as silver, as a background color, and a code printed on a printing tape having a shined surface, because mirror reflection of the light is caused on the code, and it is difficult for the light to return to the code reader. Even in a combination of colors with a high successful reading rate, e.g., a combination between white as the background color and black as the bar color, the rate of light absorption is higher, and accordingly the successful reading rate is lower when the printing tape is formed of cloth than when the printing tape is formed of paper.

To improve usability of the user, tape cartridges with various combinations between the type of the printing tape and the ink color are available. The mountable tape cartridges are determined by the model of the label writer 2. That is, the tape cartridge accommodating a combination of the printing tape and the ink ribbon which is suited to reading of the code is in some cases mounted on the label writer 2, and the tape cartridge accommodating a combination of the printing tape and the ink ribbon which is unsuited to reading of the code is in other cases mounted on the label writer 2. In other words, the combinations of the printing tape and the ink ribbon printable by the label writer 2 include: a first combination suited to reading of the code (for example, the probability of successful reading of the code is a first value); and a second combination unsuited to reading of the code (for example, the probability of successful reading of the code is a second value that is less than the first value). For example, in the case where the printing tape has a color easily reflecting red light, such as white, yellow, and orange, and the ink ribbon has a color easily absorbing red light, such as black, dark blue, and dark green, the combination of the printing tape and the ink ribbon is the first combination in which the probability of successful reading of the code is the relatively high first value. In the case where the colors of the printing tape and the ink ribbon are approximate to each other or in the case where the printing tape has a color of high light reflectivity, such as silver, or is formed of a material having a shined surface, the combination of the printing tape and the ink ribbon is the second combination in which the probability of successful reading of the code is the relatively low second value that is less than the first value. The tape cartridge accommodating the printing tape and the ink ribbon in the second combination may be mounted on the label writer 2. In other cases, even when the user designates the combination between the tape color and the ink color on a screen displayed according to the image editing application 141, the tape cartridge corresponding to the designated combination cannot be mounted on the label writer 2.

To solve these problems, the non-transitory memory 14 of the information processing apparatus 1 stores the combination table 142 illustrated in FIG. 2 for each model name of the label writer 2. The combination table 142 stores the type of the tape cartridge which is suited to reading of the code. Each record stores the tape width, the tape ID, and the color name.

The tape width is the width of the printing tape. The tape ID is assigned to the tape cartridge. The color name indicates the combination between the tape color and the ink color in the tape cartridge corresponding to the tape ID. "LAMINATED" for the tape color in FIG. 2 indicates that the tape is laminated. "FROSTED" in FIG. 2 indicates that a shine on a surface of the tape is removed to lower the light reflectivity. The number of the combinations between the tape color and the ink color increases with increase in needs of the tape width. One pattern, i.e., a color combination of white and black, is registered for the tape width of 3.5 mm, but eight patterns, i.e., seven color combinations in addition to the combination of white and black, are registered for the tape width of 12 mm.

Here, each of combinations of the tape width, the tape color, and the ink color which are not registered in the combination table 142 is a particular combination of the tape color of the printing tape and the ink color of the ink ribbon which is unsuited to reading of the code (for example, the probability of successful reading of the code is the second value). The particular combination is one example of a particular combination corresponding to the model of the label writer 2 which is obtained by the information processing apparatus 1 or corresponding to the type of the printing tape, such as the tape width and the material. In the case where the combination of the tape width, the tape color, and the ink color input by the user is not stored in the combination table 142 corresponding to the model of the label writer 2, for example, the image editing application 141 displays an alert message on the operation interface 15. In the present embodiment, the combination of the tape width, the tape color, and the ink color input by the user may be hereinafter referred to as "obtained combination". In the case where the obtained combination is stored in the combination table 142 corresponding to the model of the label writer 2, the image editing application 141 does not display the alert message on the operation interface 15 because the obtained combination is a combination of colors suited (not unsuited) to reading of the code (for example, the probability of successful reading of the code is the first value).

There will be next described a case where the image editing application 141 causes the label writer 2 to print an image containing a code. While the following description will be provided taking a QR code Q as one example, it should be understood that the image editing application 141 may be applied to one-dimensional codes such as the bar code, and two-dimensional codes other than the QR code Q.

When the image editing application 141 is started in the information processing apparatus 1, the operation interface 15 displays an edit screen for editing an image to be printed by the label writer 2. The edit screen displays a list of templates of print images, for example. When a template containing a QR code is selected by the user from among the templates, the information processing apparatus 1 controls the operation interface 15 according to the image editing application 141 to display the edit screen illustrated in FIG. 3A, for example. The image editing application 141, upon its start-up, communicates with the label writer 2 to obtain the model name of the label writer 2. The model name is one example of the type of the printer.

The edit screen illustrated in FIG. 3A, for example, contains: an outline 31 indicating the shape of the printing tape as the printing medium to be used by the label writer 2; and a line indicating a print region 32 for the QR code which is set within the shape of the printing tape. A Print button 33 is also displayed on the edit screen in the example in FIG. 3A. It is noted that the position and the size of the region to which the QR code is to be added may be designated by the user and may be automatically determined by the image editing application 141 based on the width of the printing tape, for example.

When a touch operation performed on the print region 32 of the edit screen is accepted, for example, the image editing application 141 creates the QR code Q storing the input information in the cells and inserts the QR code Q into the print region 32. The QR code Q contains an error correction level.

When the QR code Q is inserted, as illustrated in FIG. 3B, the image editing application 141 causes the operation interface 15 to display a list of indications 35 each indicating a combination between the tape color and the ink color, for example. Each of the indications 35 includes: an icon 35x which is an image indicating the tape color and the ink color; and a text 35y describing the tape color and the ink color corresponding to the icon 35x. The image editing application 141 displays all the selectable color combinations of the tape cartridge. A Done button 34 is also displayed in the example illustrated in FIG. 3B. When one of the indications 35 is selected by a touch operation, the image editing application 141 adds a check mark M indicating selection, to the edit screen. The edit screen in FIG. 3B also contains an input field 36 to which the tape width is to be input. When the Done button 34 is touched in the state in which the check mark M is displayed, and the tape width is input, the image editing application 141 accepts designation of the combination of the tape width, the tape color, and the ink color. In the present embodiment, this designated combination of the tape width, the tape color, and the ink color corresponds to the obtained combination.

As illustrated in FIG. 3C, the image editing application 141 displays an obtained combination 37 on the edit screen for a check of the user, for example. The edit screen illustrated in FIG. 3C also contains a tape width 38 designated additionally. The edit screen also contains: the Print button 33 for instructing start of printing; and a Change button 40 for instructing change of the obtained combination.

In the case where the obtained combination is a combination of the type of the printing tape and the ink color which is unsuited to reading of the QR code Q (the particular combination (as one example of a second combination)) and is included in the particular combination or combinations corresponding to the model name of the label writer 2 or the tape width, as illustrated in FIG. 3C, the image editing application 141 adds an alert message 39 relating to reading accuracy of the code, to the edit screen. That is, the image editing application 141 reads the tape ID or IDs corresponding to the tape width set on the screen in FIG. 3B, from the combination table 142 corresponding to the model name of the label writer 2. The image editing application 141 then determines whether the combination between the tape color and the ink color which is set on the screen illustrated in FIG. 3B is included in the color combination or combinations corresponding to the read tape ID or IDs.

For example, the image editing application 141 reads, from the non-transitory memory 14, the combination table 142 (FIG. 2) corresponding to the model name obtained from the label writer 2.

In the case where 9 mm is designated as the tape width, and a combination between fluorescent orange as the tape color and black as the ink color is designated (the obtained combination is "FLUORESCENT ORANGE/BLACK") on the edit screen illustrated in FIG. 3B, for example, as illustrated in FIG. 2, the obtained combination is not contained in the color names associated with the tape width of 9 mm. In other words, the obtained combination is included in the particular combinations corresponding to the model name of the label writer 2 and the tape width input by the user. As illustrated in FIG. 3C, the image editing application 141 causes the operation interface 15 to display the alert message 39 saying "Reading can be Failed", for example.

After displaying the alert message 39, the image editing application 141 recreates the QR code Q with a higher error correction level (e.g., the QR code Q for which the error correction level is changed from a first error correction level to a second error correction level that is higher than the first error correction level in error correction level). An amount of information storable in the QR code Q differs depending upon the version of the QR code Q, the error correction level, and the type of data. The error correction level is an amount of Reed-Solomon Coding added to data area of the QR code Q. Four kinds of levels L, M, Q, H are provided as the error correction levels for the QR code Q. The levels L, M, Q, H increase in this order. The amount of storable information increases with increase in the error correction level in the same version. In the case of the same information to be stored, recreating the QR code Q with a higher error correction level may increase the reflectivity of a background portion of the QR code even in the case of the same combination between the background color and the ink color. Also, even in the case where the QR code is partly unreadable, correcting the QR code may make it readable.

Thus, in the case where the obtained combination is not included in the color name(s) of the tape ID(s) extracted from the combination table 142 based on the tape width, in other words, in the case where the obtained combination is included in the particular combinations corresponding to the model name of the label writer 2 and the tape width input by the user, the error correction level is made higher than in the case where the obtained combination is a color combination corresponding to the tape width and a color combination in the tape cartridge usable for the label writer 2, in other words, in the case where the obtained combination is not included in the particular combinations corresponding to the model of the label writer 2. This increases the probability of successful reading of the code even in the case where the obtained combination is not registered in the combination table 142 and is unsuited to reading of the code.

When the Change button 40 on the screen in FIG. 3C is touched, for example, the image editing application 141 displays the edit screen in FIG. 3B again. This redisplayed edit screen allows the user to change the tape width and/or change the color combination by touching the indication 35 indicating the combination between the tape color and the ink color. When the Done button 34 is touched in the state in which the tape width and/or the color combination is changed, the change of the obtained combination is accepted. The image editing application 141 determines whether the changed obtained combination is included in the particular combinations corresponding to the model of the label writer 2. The method of this determination is similar to the above-described method of determining whether the obtained combination is included in the particular combinations corresponding to the model of the label writer 2, and an explanation thereof is dispensed with.

When the Print button 33 displayed on the edit screen is touched, the image editing application 141 creates image data for printing based on the image being edited and transmits the image data to the label writer 2. The label writer 2 performs printing based on the received image data. This operation creates a label on which the QR code Q is printed.

Figure 4:
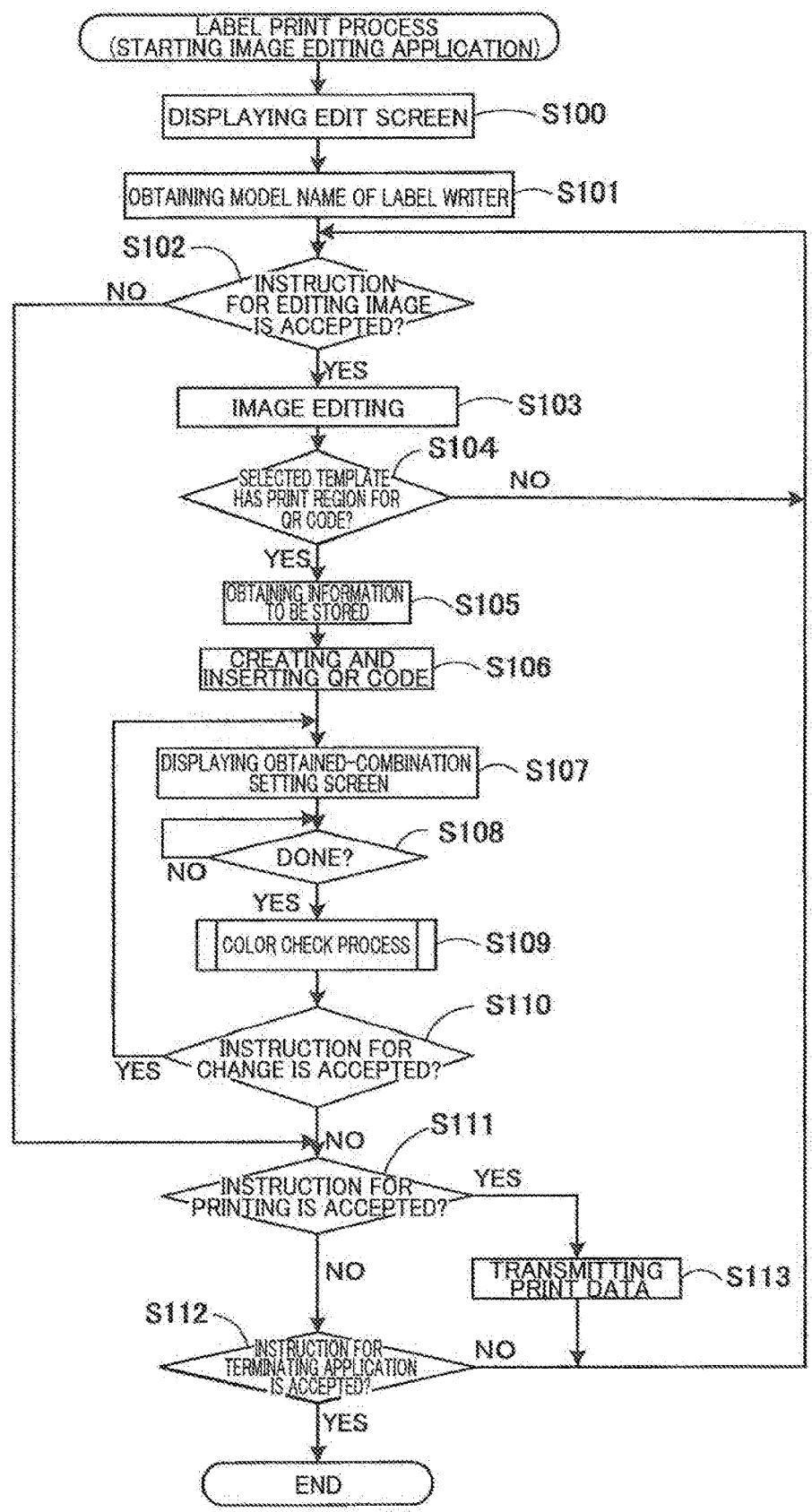
FIG. 4 is a flowchart representing a procedure of a label print process.

There will be next described, with reference to the flowchart in FIG. 4, a procedure of a label print process to be executed by the information processing apparatus 1 for executing the above-described code creating processings in the code creating system 100 according to the present embodiment. This label print process is executed by the CPU 11 of the information processing apparatus 1 when the image editing application 141 is started. That is, the label print process and a color check process which will be described below are included in the image editing application 141.

The label print process begins with S100 at which the CPU 11 controls the operation interface 15 to display the edit screen illustrated in FIG. 3A, for example. The CPU 11 at S101 obtains the model name of the label writer 2 connected to the information processing apparatus 1. The model name is one example of the type of the printer.

The CPU 11 may obtain the model name by communicating with the label writer 2 via the communication interface 16. It is noted that the CPU 11 accepts selection of the printer before the processing at S101 in the case where the selected label writer 2 is not connected to the information processing apparatus 1 at the start of the image editing application 141, or the printer has not been selected before the start of the image editing application 141.

The CPU 11 at S102 determines whether an instruction for editing the image is accepted. When the CPU 11 determines that the instruction for editing the image is not accepted (S102: NO), this flow goes to S111 at which the CPU 11 determines whether an instruction for performing printing is accepted. When the CPU 11 determines that the instruction for performing printing is not accepted (S111: NO), the CPU 11 at S112 determines whether an instruction for terminating the application is accepted. When the CPU 11 determines that the instruction for terminating the application is not accepted (S112: NO), this flow returns to S102.

When the CPU 11 determines that the instruction for editing the image is accepted (S102: YES), the CPU 11 at S103 edits the image. For example, when a template is selected by the user having operated the operation interface 15, the CPU 11 creates an image related to the template and displays the created image on the operation interface 15.

The CPU 11 at S104 determines whether the selected template has a print region for the QR code. When the CPU 11 determines that the selected template does not have the print region for the QR code (S104: NO), this flow returns to S102.

In contrast, when the CPU 11 determines that the selected template has the print region for the QR code (S104: YES), the CPU 11 at S105 controls the operation interface 15 to display a screen for input of information to be stored into the QR code and obtains the information to be stored into the QR code. The CPU 11 at S106 creates a QR code Q and inserts it into the print region. That is, the CPU 11 determines the version of the QR code Q based on an amount of the information obtained at S105 and the error correction level. Also, the CPU 11 determines the print region based on details of the image editing. The CPU 11 then sets the number of cells for each side based on the determined version, creates the QR code Q by storing the information into the cells provided on the print region, and inserts the created QR code Q into the print region 32. It is noted that processings at S105 and S106 may be skipped in the second or subsequent execution.

The CPU 11 at S107 controls the operation interface 15 to display a screen for setting the obtained combination. For example, as illustrated in FIG. 3B, the screen for setting the obtained combination contains: the input field 36 for input of the tape width; a list of the indications 35 of the combinations between the tape color and the ink color; and the Done button 34. Until the Done button 34 is touched (S108: NO), the CPU 11 displays the screen illustrated in FIG. 3B.

In contrast, the Done button 34 is touched in a state in which the tape width is input to the input field 36 illustrated in FIG. 3B, and the check mark M is displayed by touch of one of the indications 35 (S108: YES), the CPU 11 executes the color check process at S109.

Figure 5:
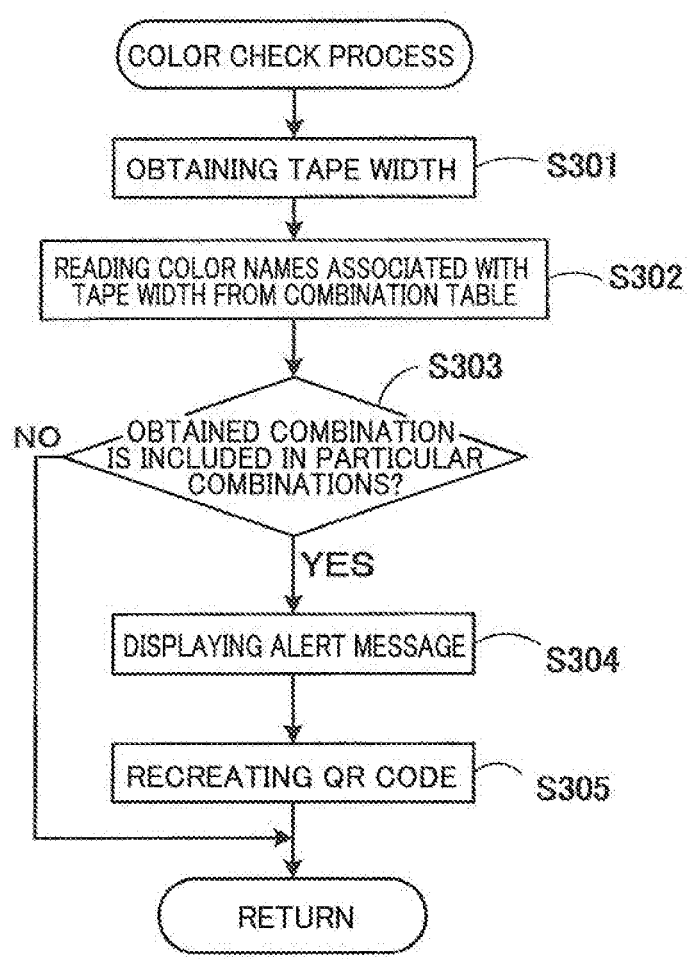
FIG. 5 is a flowchart representing a procedure of a color check process.

There will be next described a procedure of the color check process with reference to FIG. 5. The color check process begins with S301 at which the CPU 11 obtains the tape width set at S107 and S108.

The CPU 11 at S302 reads the combination table 142 corresponding to the model name obtained at S101, from the non-transitory memory 14 and obtains the color name or names associated with the tape width obtained at S301.

The CPU 11 at S303 determines whether the obtained combination is included in the particular combinations. That is, the CPU 11 determines whether the obtained combination is included in the color name or names obtained at S302. The processing at S303 is one example of a determination processing. When the CPU 11 determines that the obtained combination is included in the particular combinations (S303: YES), the CPU 11 displays the alert message at S304. The processing at S304 is one example of an alert processing.

For example, in the case where the tape width is set to 9 mm, and the obtained combination is set to a combination between fluorescent orange as the tape color and black as the ink color on the edit screen illustrated in FIG. 3B, as illustrated in FIG. 2, the obtained combination is a combination different from the color name for the tape ID corresponding to the tape width of 9 mm and is included in the particular combinations corresponding to the model of the label writer 2 (the tape width) (S303: YES). In this case, as illustrated in FIG. 3C, the CPU 11 at S304 controls the operation interface 15 to display the alert message 39 saying "Reading can be Failed", for example.

After displaying the alert message 39, the CPU 11 at S305 recreates the QR code Q at an error correction level that is higher than the error correction level used in the case where the obtained combination is not included in the particular combinations corresponding to the model of the label writer 2. The processing at S305 is one example of a creating processing. After recreating the QR code Q, the CPU 11 terminates the color check process and returns to the flow in FIG. 4.

When the CPU 11 determines that the obtained combination set on the edit screen illustrated in FIG. 3B is not included in the particular combinations corresponding to the model of the label writer 2 (S303: NO), the CPU 11 terminates the color check process and returns to the flow in FIG. 4. For example, in the case where the obtained combination is a combination of yellow as the tape color and black as the ink color, the color combination matches one of the color names associated with the tape width of 9 mm and is not included in the particular combinations. In this case, the CPU 11 does not display the alert message on the operation interface 15.

Returning to FIG. 4, upon the completion of the color check process at S109, the CPU 11 at S110 determines whether an instruction for changing the obtained combination is accepted. For example, when the Change button 40 illustrated in FIG. 3C is touched, the CPU 11 accepts the instruction for changing the obtained combination (S110: YES). In this case, this flow returns to S107 at which the CPU 11 displays the screen illustrated in FIG. 3B again. The processings at S107-S109 are as described above.

When the Change button 40 illustrated in FIG. 3C is not touched (S110: NO), and the Print button 33 is touched, for example, the CPU 11 accepts a print instruction (S111: YES). In this case, the CPU 11 at S113 creates data for printing based on the image being edited and controls the communication interface 16 to transmit the created data to the label writer 2. The label writer 2 performs printing based on the received data for printing.

Here, in the case where the alert message is displayed in the color check process (S109), when the print instruction is accepted without accepting the instruction for changing the obtained combination, the CPU 11 transmits the print data to the label writer 2 to cause the label writer 2 to print the code. Thus, in the case where the user desires to perform printing without changing the color combination, printing is performed in a color desired by the user even with lower reading accuracy.

It is noted that, even in the case where the obtained combination is not changed after the alert message is displayed, the CPU 11 executes the processing at S305 in FIG. 5, whereby the error correction level is higher than in the case where the CPU 11 determines that the obtained combination is not included in the particular combinations corresponding to the model of the label writer 2 and is a combination unsuited to reading of the code. Thus, there is a possibility that the probability of successful reading of the printed QR code is higher than the probability of successful reading of the QR code Q before recreation at S305.

Upon the completion of the processing at S113, this flow returns to S102. When the CPU 11 at S112 determines that the instruction for terminating the application is accepted (S112: YES), the CPU 11 terminates the label print process.

In the code creating system 100 according to the present embodiment, as described above, there are a plurality of combinations between the printing tape and the ink ribbon, and printable combinations vary with the type of the label writer 2. The combinations between the printing tape and the ink ribbon include combinations unsuited to reading of the code when the code is printed (the particular combinations). Thus, in the case where the combination between the printing tape and the ink ribbon is obtained, when the obtained combination is included in the particular combinations corresponding to the type of the printer, the information processing apparatus outputs the alert message saying "Reading can be Failed" or "Probability of Successful Reading of Code can be Lowered", before printing, for example, enabling the user to recognize that the combination between the printing medium and the coloring agent being selected is unsuited to reading of the code, leading to reduction in printing in such a combination.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

Figure 6:
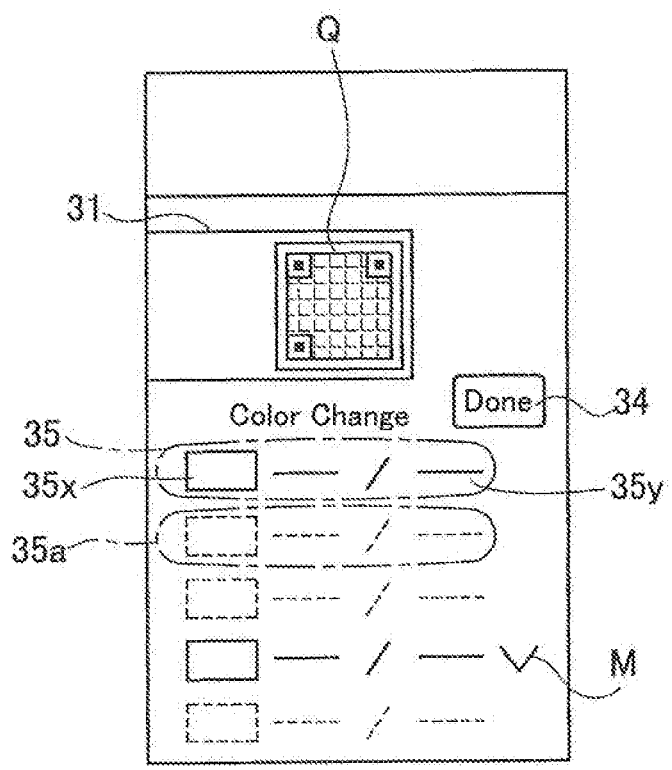
FIG. 6 is a view of one example of an edit screen for color change.

In the above-described embodiment, for example, when displaying the edit screen at S107, the image editing application 141 displays all the designatable combinations between the tape color and the ink color, on the edit screen for setting the combination in FIG. 3B. In contrast, for example, indications 35a indicating the combinations between the tape color and the ink color unsuited to reading of the code (the particular combinations), which combinations are included in the particular combinations corresponding to the model of the label writer 2, among the designatable combinations between the tape color and the ink color may not be displayed on the edit screen for setting the combination such that the combinations are not selectable. Examples of the method of not displaying (removing) the combinations include: a method of graying out indications of the combinations unsuited to reading as illustrated in FIG. 6; and a method of not displaying the indications of the combinations unsuited to reading on the operation interface 15. This reduces printing of the QR code Q unsuited to reading thereof, without displaying the alert message.

In the above-described embodiment, the CPU 11 displays the screen illustrated in FIG. 3B and causes the user to input the combination of the tape width, the tape color, and the ink color to set the obtained combination at S107-S108 in FIG. 4, and the CPU 11 at S303 in FIG. 5 executes the determination by taking the combination of the tape width, the tape color, and the ink color input by the user, as the obtained combination. In contrast, the CPU 11 according to the image editing application 141 may receive the width and the color of the printing tape accommodated in the tape cartridge mounted in the label writer 2 and the ink color of the ink ribbon via the communication interface 16 before the determination at S303 in FIG. 5 and execute the determination at S303 using the received information. That is, in the case where the information processing apparatus 1 has received information about the model (a first signal) output from the label writer 2, which information includes first information for identifying the type of the printing tape mounted on the label writer, the information processing apparatus 1 may obtain the type of the printing tape. In the case where the information processing apparatus 1 has received information about the model (a second signal) output from the label writer 2, which information includes second information for identifying the color of the ink ribbon mounted on the label writer, the information processing apparatus 1 may obtain the color of the ink ribbon. The information processing apparatus 1 may execute the processings at S303 and S304 in response to receiving the first signal and the second signal. The information processing apparatus 1 may be configured to receive the tape color from the label writer 2 and instruct the user to input the combination between the tape color and the ink color, for example. In this case, the CPU 11 may at S302 in FIG. 5 check the received tape width on the combination table 142 corresponding to the model name of the label writer 2 to read the color names corresponding to the tape width, and at S303 determine whether the input tape color and ink color is included in the color names.

The CPU 11 may not execute the processing for changing the error correction level at S305. Increase in the error correction level may increase the size of the code, leading to a possibility that printing cannot be performed depending upon the size of the label. However, this problem is eliminated by not executing the processing for changing the error correction level. It is noted that in the case where the error correction level is made changeable as an option, the probability of successful reading is increased even for the color combination unsuited to reading, making it possible to print the QR code Q so as to meet a preference of the user.

For example, each of the number of the information processing apparatuses 1 and the number of the label writers 2 is not limited to one and may be two or more.

For example, the information processing apparatus 1 may at S302 obtain the tape width input by the user to the information processing apparatus 1.

The tape color and the ink color may not be selected simultaneously on the same screen as illustrated in FIG. 3B and may be selected respectively on different screens.

The printer is not limited to the label writer. The printing method is not limited to the thermal transfer and may be any of ink-jet printing, electronic photographic printing, and thermal printing, for example. The printing medium is not limited to the printing tape and may be any of a plain paper sheet, a postcard, and a card, for example. The printing medium may have any size and may be formed of any material. In the case where the printer is an ink-jet printer, for example, the colors of a background and characters (blocks) of the QR code Q may be changed by the user, and the background color may be set to white to increase the successful reading rate of the code.

The alert message may not be displayed when a color combination is selected on the edit screen illustrated in FIG. 3B. For example, the alert message may be displayed on the operation interface 15 after the print instruction is accepted at S111 and before the print data is transmitted at S113. The CPU 11 may execute the color check process before creating the QR code Q at S106 and display the alert message on the operation interface 15 before creating the QR code.

In the case where the screen for designating the color combination in FIG. 3B is displayed on the operation interface 15, the information processing apparatus 1 may obtain the tape width from the tape ID assigned to the tape cartridge mounted on the label writer 2, extract the tape ID corresponding to the tape width, from the combination table 142, and display color combinations other than the color combination corresponding to the extracted tape ID such that the order of priority of each of the color combinations other than the color combination corresponding to the extracted tape ID is lower than the order of priority of the color combination corresponding to the extracted tape ID. This configuration makes it difficult for the user to select the combination between the tape color and the ink color which is unsuited to reading of the code.

While the print instruction is accepted according to the image editing application 141 in the present embodiment, the present disclosure may be applied to an application configured only to create a two-dimensional code without accepting the print instruction. For example, the present disclosure may be applied to various applications such as a plug-in application configured to create image data containing the two-dimensional code such as the QR code Q and pass the created image data to another application for printing.

Some of the color combinations corresponding to the label writer may not be displayed on the edit screen illustrated in FIG. 3B, for example. For example, color combinations unsuited to reading and not stored in the combination table 142 among all the color combinations corresponding to the label writer may not be displayed and may be grayed out.

The color combinations not stored in the combination table 142 among the color combinations corresponding to the label writer 2 may be displayed on the edit screen illustrated in FIG. 3B at positions lower than the color combinations stored in the combination table 142, for example. This configuration reduces a probability that the user selects one of the color combinations unsuited to reading. In the case where information about the width and the color of the printing tape accommodated in the tape cartridge mounted in the label writer 2 and the ink color of the ink ribbon is received from the label writer 2 during execution of the image editing application 141, and the received information is stored in the combination table 142, the color combination corresponding to the tape ID may be displayed at the highest position. This configuration increases a possibility that the code easily read by the code reader is created without changing the tape cartridge, resulting in improved convenience to the user.

In the above-described embodiment, the tape cartridge accommodating the printing tape and the ink ribbon is mounted on the label writer 2, and the type of the printing tape and the ink color of the ink ribbon may be obtained from the tape ID assigned to the tape cartridge, for example. In contrast, different cassettes may respectively contain the printing tape and the ink ribbon and may be assigned with respective IDs. In this configuration, the ID assigned to each of the cassettes may be included in information about the type of the printer and obtained by the information processing apparatus 1 from the label writer 2.

In the case where the alert message is displayed, the error correction level may be reselected.

In the case where the QR code Q is inserted as an object, the CPU 11 may determine whether a combination between the background color at a position of the insertion and the color of the QR code Q to be inserted is included in the particular combinations.

Figure 7:
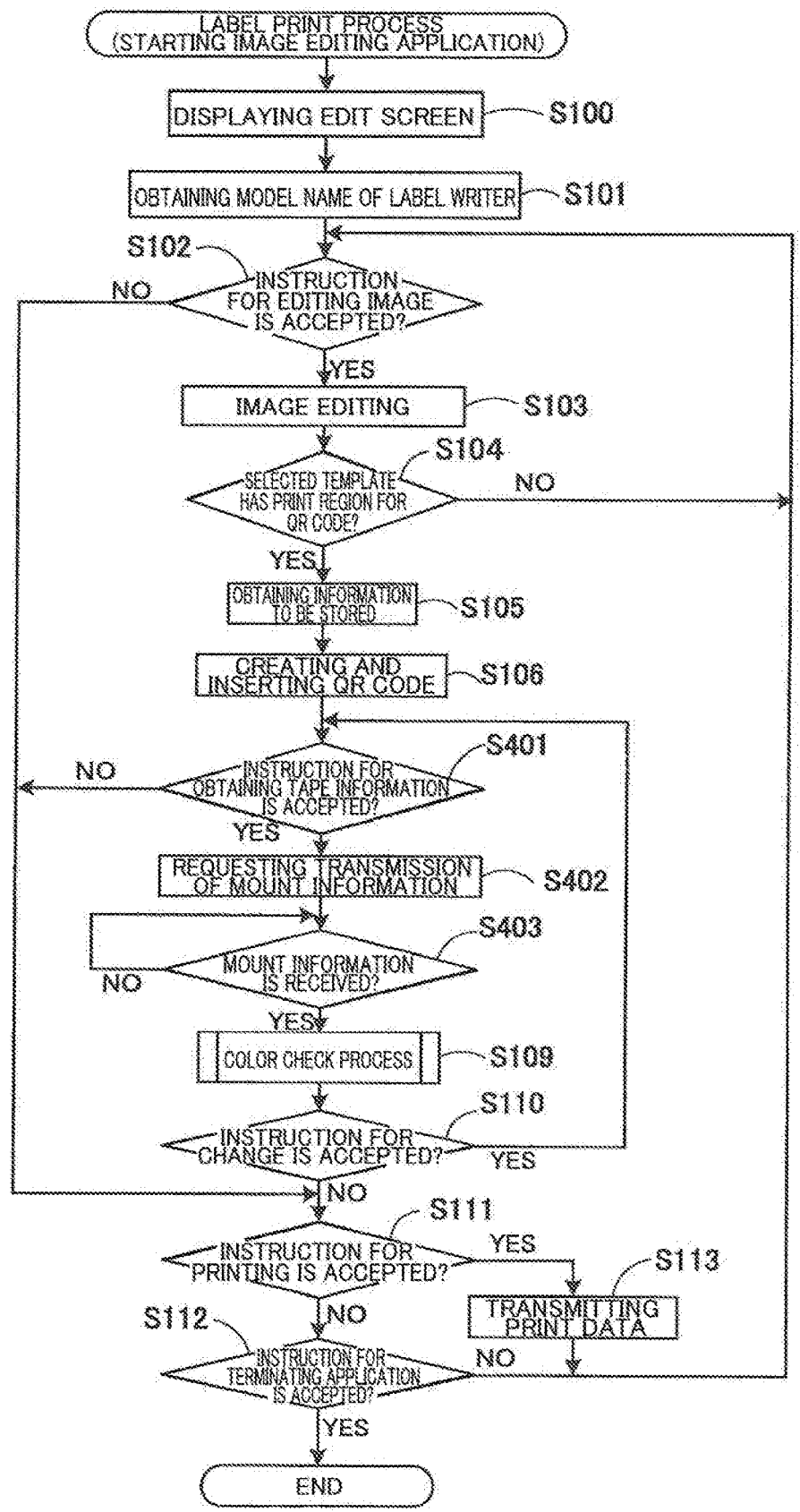
FIG. 7 is a flowchart representing a procedure of a label print process in a modification.

For example, as illustrated in FIG. 7, in the case where the QR code Q is created and inserted, the CPU 11 may at S401 display a screen for checking whether mount information containing the width and the color of the printing tape accommodated in the tape cartridge mounted in the label writer 2 and the ink color of the ink ribbon is to be obtained from the label writer 2 and determine whether the mount information is to be received. When information indicating that the mount information is not to be obtained is input to the screen by the user (S401: NO), the flow in FIG. 7 goes to S111. When information indicating that the mount information is to be obtained is input to the screen by the user (S401: YES), the CPU 11 at S402 requests the label writer 2 to transmit the mount information. The CPU 11 repeats this processing while the mount information is not received from the label writer 2 (S403: NO). When the mount information is received from the label writer 2 (S403: YES), the CPU 11 executes the color check process at S109. Preferably in the color check process in FIG. 5, the CPU 11 at S301 obtains tape information contained in the mount information received from the label writer 2 and at S303 determines whether the tape color and the ink color contained in the mount information are included in the particular combinations.

Even in the case where the print instruction is accepted after outputting the alert message, when the obtained combination is not changed to be included in the particular combinations, the CPU 11 may not transmit the print instruction to the label writer 2. This increases a possibility of printing a readable code. It is noted that, in the case where the print instruction is accepted after displaying the alert message, immediate printing enables printing of the code according to the desire of the user.

The combination table 142 may store the model name (such as the name of the printer) instead of the tape width. The image editing application 141 may inquire of the printer, such as the label writer 2, about a combination of the model name, the type of the mounted printing medium (e.g., the tape width, the tape color, and the material), and the color of the coloring agent, receive the combination, refer to the combination table storing the received model name, and determine whether the obtained combination is included in the particular combinations.

The processings in the above-described embodiment may be executed by hardware such as a single CPU, a plurality of CPUs, and an ASIC or combination thereof. Also, the processings in the above-described embodiment may be executed in various forms such as a non-transitory storage medium storing instructions for executing the processings and methods for executing the processings.

What is claimed is:

1. A non-transitory storage medium storing a plurality of instructions readable by a computer of an information processing apparatus,
   wherein the information processing apparatus comprises a communication interface,
   wherein, when executed by the computer, the plurality of instructions cause the information processing apparatus to execute:
      a printer-type obtaining processing in which the information processing apparatus obtains a type of a printer;
      a combination obtaining processing in which the information processing apparatus obtains a combination between a type of a printing medium and a color of a coloring agent for printing of a code by the printer;
      a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable by the printer of the type obtained in the printer-type obtaining processing comprises (i) the first combination in which a probability of reading of the code is a first value and (ii) the second combination in which the probability of reading of the code is a second value that is less than the first value; and
      an alert processing in which the information processing apparatus outputs an alert message in a case where the information processing apparatus in the determination processing determines that the obtained combination is included in the second combination or determines that the obtained combination is not included in the first combination.

2. The non-transitory storage medium according to claim 1, wherein the type of the printing medium comprises information at least indicating a color of the printing medium.

3. The non-transitory storage medium according to claim 1, wherein, when executed by the computer, the plurality of instructions cause the information processing apparatus to execute a creating processing in which:
   in a case where the information processing apparatus in the determination processing determines that the obtained combination is not included in the second combination or determines that the obtained combination is included in the first combination, the information processing apparatus creates the code at a first error correction level; and
   in the case where the information processing apparatus in the determination processing determines that the obtained combination is not included in the first combination or determines that the obtained combination is included in the second combination, the information processing apparatus creates the code at a second error correction level that is greater than the first error correction level in the probability of reading of the code.

4. The non-transitory storage medium according to claim 1, wherein, when executed by the computer, the plurality of instructions cause the information processing apparatus to, in the combination obtaining processing:
   in response to receiving a first signal output from the printer and comprising first information for identifying the type of the printing medium set in the printer, determine, based on the first information, a type usable for the printing medium for printing of the code by the printer; and
   in response to receiving a second signal output from the printer and comprising second information for identifying the color of the coloring agent set in the printer, determine, based on the second information, a color usable for the coloring agent for printing of the code by the printer.

5. The non-transitory storage medium according to claim 1,
   wherein, when executed by the computer, the plurality of instructions cause the information processing apparatus to accept a determining operation of determining the obtained combination for printing of the code, and
   wherein, when executed by the computer, the plurality of instructions cause the information processing apparatus to, in the combination obtaining processing:
      obtain the type of the printing medium and the color of the coloring agent based on the determining operation; and
      execute the determination processing and the alert processing in response to accepting the determining operation.

6. The non-transitory storage medium according to claim 1, wherein, when executed by the computer, the plurality of instructions cause the information processing apparatus to:
   accept a print instructing operation of instructing printing of an image comprising the code; and
   execute the determination processing and the alert processing in response to accepting the print instructing operation.

7. The non-transitory storage medium according to claim 1, wherein, when executed by the computer, the plurality of instructions cause the information processing apparatus to:
   accept a creation instructing operation of instructing creation of the code; and
   execute the determination processing and the alert processing in response to accepting the creation instructing operation.

8. The non-transitory storage medium according to claim 1,
   wherein, when executed by the computer, the plurality of instructions cause the information processing apparatus to display a screen instructing selection of one of a plurality of combinations between the color of the coloring agent and the type of the printing medium printable by the printer of the type obtained in the printer-type obtaining processing, and
   wherein a display ordinal number of the second combination is less than that of the first combination on the screen.

9. The non-transitory storage medium according to claim 1, wherein, when executed by the computer, the plurality of instructions cause the information processing apparatus to execute:
   a print-instruction accepting processing in which the information processing apparatus accepts a print instruction; and
   a transmission processing in which the information processing apparatus transmits the print instruction to the printer in the obtained combination established when the alert message is output, in a case where the information processing apparatus accepts the print instruction in the print-instruction accepting processing after the alert message is output in the alert processing.

10. A non-transitory storage medium storing a plurality of instructions readable by a computer of an information processing apparatus,
wherein the information processing apparatus comprises a communication interface configured to be connected to a printer,
wherein, when executed by the computer, the plurality of instructions cause the information processing apparatus to execute:
a printer-type obtaining processing in which the information processing apparatus obtains a type of the printer; and
a selection processing in which the information processing apparatus selects and determines a combination from among a plurality of combinations between a type of a printing medium and a color of a coloring agent for printing of a code by the printer,
wherein, when executed by the computer, the plurality of instructions cause the information processing apparatus to execute the selection processing in which in a case where a combination between the color of the coloring agent and the type of the printing medium printable by the printer of the type obtained in the printer-type obtaining processing comprises (i) a first combination in which a probability of reading of the code is a first value and (ii) a second combination in which the probability of reading of the code is a second value that is less than the first value, the information processing apparatus excludes the second combination from the plurality of combinations.

11. The non-transitory storage medium according to claim 10, wherein, when executed by the computer, the plurality of instructions cause the information processing apparatus to execute a creating processing in which:
in a case where the information processing apparatus in the determination processing determines that the obtained combination is not included in the second combination or determines that the obtained combination is included in the first combination, the information processing apparatus creates the code at a first error correction level; and
in a case where the information processing apparatus in the determination processing determines that the obtained combination is not included in the first combination or determines that the obtained combination is included in the second combination, the information processing apparatus creates the code at a second error correction level that is greater than the first error correction level in the probability of reading of the code.

12. A non-transitory storage medium storing a plurality of instructions readable by a computer of an information processing apparatus,
wherein the information processing apparatus comprises a communication interface configured to be connected to a printer,
wherein, when executed by the computer, the plurality of instructions cause the information processing apparatus to execute:
a printer-type obtaining processing in which the information processing apparatus obtains a type of the printer;
a medium-type obtaining processing in which the information processing apparatus obtains a length of a printing medium mounted in the printer in at least one direction;
a combination obtaining processing in which the information processing apparatus obtains a combination between a type of a printing medium and a color of a coloring agent for printing of a code by the printer;
a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable, in the length of the printing medium mounted in the printer in the at least one direction, by the printer of the type obtained in the printer-type obtaining processing comprises (i) the first combination in which a probability of reading of the code is a first value and (ii) the second combination in which the probability of reading of the code is a second value that is less than the first value; and
an alert processing in which the information processing apparatus outputs an alert message in a case where the information processing apparatus in the determination processing determines that the obtained combination is included in the second combination or determines that the obtained combination is not included in the first combination.

13. The non-transitory storage medium according to claim 12, wherein, when executed by the computer, the plurality of instructions cause the information processing apparatus to execute a creating processing in which:
in a case where the information processing apparatus in the determination processing determines that the obtained combination is not included in the second combination or determines that the obtained combination is included in the first combination, the information processing apparatus creates the code at a first error correction level; and
in the case where the information processing apparatus in the determination processing determines that the obtained combination is not included in the first combination or determines that the obtained combination is included in the second combination, the information processing apparatus creates the code at a second error correction level that is greater than the first error correction level in the probability of reading of the code.

14. A code creating system comprising:
an information processing apparatus comprising a controller; and
a printer,
wherein the controller is configured to control the information processing apparatus to execute:
a printer-type obtaining processing in which the information processing apparatus obtains a type of a printer;
a combination obtaining processing in which the information processing apparatus obtains a combination between a type of a printing medium and a color of a coloring agent for printing of a code by the printer;
a determination processing in which the information processing apparatus determines whether an obtained combination that is the combination obtained in the combination obtaining processing is included in a first combination or whether the obtained combination is included in a second combination, wherein a combination between the color of the coloring agent and the type of the printing medium printable by the printer of the type obtained in the printer-type obtaining processing comprises (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

15. The code creating system according to claim 14, wherein the controller is configured to control the information processing apparatus to execute a creating processing in which:

in a case where the information processing apparatus in the determination processing determines that the obtained combination is not included in the second combination or determines that the obtained combination is included in the first combination, the information processing apparatus creates the code at a first error correction level; and in a case where the information processing apparatus in the determination processing determines that the obtained combination is not included in the first combination or determines that the obtained combination is included in the second combination, the information processing apparatus creates the code at a second error correction level that is greater than the first error correction level in the probability of reading of the code.

16. A code creating system comprising:
an information processing apparatus comprising a controller; and
a printer,
wherein the controller is configured to control the information processing apparatus to execute:
a printer-type obtaining processing in which the information processing apparatus obtains a type of the printer; and
a selection processing in which the information processing apparatus selects and determines a combination from among a plurality of combinations between a type of a printing medium and a color of a coloring agent for printing of a code by the printer,
wherein, when executed by the computer, the plurality of instructions cause the information processing apparatus to execute the selection processing in which in a case where a combination between the color of the coloring agent and the type of the printing medium printable by the printer of the type obtained in the printer-type obtaining processing comprises (i) a first combination in which a probability of reading of the code is a first value and (ii) a second combination in which the probability of reading of the code is a second value that is less than the first value, the information processing apparatus excludes the second combination from the plurality of combinations.

17. The code creating system according to claim 16, wherein the controller is configured to control the information processing apparatus to execute a creating processing in which:

in a case where the information processing apparatus in the determination processing determines that the obtained combination is not included in the second combination or determines that the obtained combination is included in the first combination, the information processing apparatus creates the code at a first error correction level; and in a case where the information processing apparatus in the determination processing determines that the obtained combination is not included in the first combination or determines that the obtained combination is included in the second combination, the information processing apparatus creates the code at a second error correction level that is greater than the first error correction level in the probability of reading of the code.

18. A code creating system comprising:
an information processing apparatus comprising a controller; and
a printer,
wherein the controller is configured to control the information processing apparatus to execute:
a medium-type obtaining processing in which the information processing apparatus obtains a length of a printing medium mounted in the printer in at least one direction;
a printer-type obtaining processing in which the information processing apparatus obtains a type of the printer;
a combination obtaining processing in which the information processing apparatus obtains a combination between a type of a printing medium and a color of a coloring agent for printing of a code by the printer;
a determination processing in which the information processing apparatus determines whether an obtained combination that is the combination obtained in the combination obtaining processing is included in a first combination or whether the obtained combination is included in a second combination, wherein the combination between the color of the coloring agent and the type of the printing medium printable, in the length of the printing medium mounted in the printer in the at least one direction, by the printer of the type obtained in the printer-type obtaining processing comprises (i) the first combination in which a probability of reading of the code is a first value and (ii) the second combination in which the probability of reading of the code is a second value that is less than the first value; and an alert processing in which the information processing apparatus outputs an alert message in a case where the information processing apparatus in the determination processing determines that the obtained combination is included in the second combination or determines that the obtained combination is not included in the first combination.

* * * * *